UNITED STATES PATENT OFFICE.

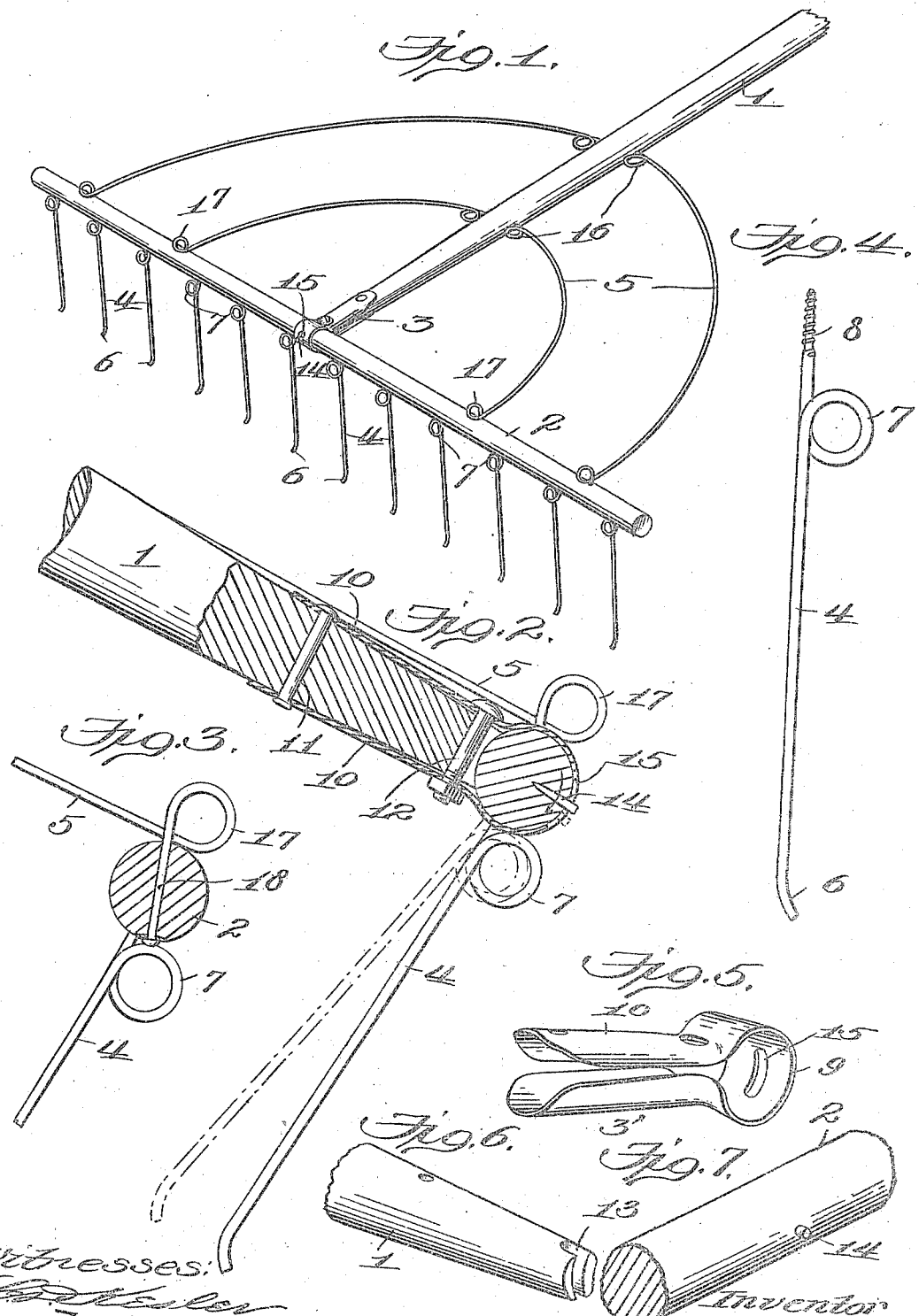

JOSEPH N. PARKER, OF KINGFIELD, MAINE, ASSIGNOR OF ONE-HALF TO LESTER L. MITCHELL, OF KINGFIELD, MAINE.

RAKE.

951,024.	Specification of Letters Patent.	Patented Mar. 1, 1910.

Application filed May 25, 1909. Serial No. 498,154.

*To all whom it may concern:*

Be it known that I, JOSEPH N. PARKER, a citizen of the United States, residing at Kingfield, in the county of Franklin and State of Maine, have invented new and useful Improvements in Rakes, of which the following is a specification.

This invention relates to new and useful improvements in rakes and more particularly to a rake embodying spring wire teeth.

One object of the invention is to provide a novel assemblage of parts, allowing of the pivotal adjustment of the head in order to vary the angular disposition of the teeth.

A further object of the invention is to provide a novel assemblage of parts allowing of the pivotal yielding of the rake head when such action is rendered necessary by the character or conditions of the work. This pivotal yielding of the rake head is independent of the yielding of the rake teeth and serves as an additional factor in preventing the breakage of the latter.

Spring wire rake teeth are well known from a broad standpoint, both in hand rakes, in horse rakes, and in connection with different types of agricultural machines. Ordinarily, the provision of spring wire teeth answers the purpose for which it was intended, namely, to prevent the bending or breaking of the teeth, but it frequently happens that, in spite of this construction, spring wire teeth will bend and break, when employed in work of heavy character or on ground of uneven, stony nature. The provision of the yielding rake head of the present invention allows of using the rake in any connection desired without the liability of bending or breakage of the teeth, the latter in turn being intrinsically stronger than the constructions now known to the art.

In the accompanying drawings, I have illustrated a preferred and advantageous embodiment of the invention.

In the said drawings: Figure 1 is a perspective view of a rake constructed in accordance with the present invention. Fig. 2 is a central longitudinal sectional view thereof. Fig. 3 is a detail view showing the assemblage of a spring wire brace, providing for the yielding of the rake head. Fig. 4 is a side elevation of one of the rake teeth. Fig. 5 is a detail perspective view of a clip which forms the connection between the handle and the rake head. Fig. 6 is a detail perspective view of the forward end portion of the handle, and Fig. 7 is a similar view of the central portion of the rake head.

Similar characters of reference designate corresponding parts throughout the several views.

The handle of the rake is indicated by the numeral 1 and is connected to a head, as 2, at a point central of the latter, through the agency of a clip 3. The head 2 carries any desired number of spring teeth, as 4, and its connection with the handle is reinforced by the provision of curved resilient wire braces, as 5.

Each tooth 4 comprises a straight resilient wire shank having a forwardly turned lower or working end, as 6, and having near its upper end a tangentially disposed coil, as 7, which augments the natural resiliency of the tooth and which projects forwardly, in order that the effect of a stress, if any, may be to increase the pitch, rather than to decrease the pitch, of the coil. Beyond the coil 7 an axial continuation, as 8, of the shank is provided, which continuation is tapered and is formed with gimlet threads to provide for the ready engagement of the tooth in the head 2.

The teeth 4 are related to the head in a novel manner which provides not only against the weakening of the head but also against the weakening of the tooth. Accordingly the gimlet ends 8 are threaded into the under side of the head, being disposed transversely therein and terminating short of the upper side of the head to provide against weakening the latter and also to provide for neatness of appearance. In such disposition, the coils 7 bear against the head, and the latter thereby constitutes a reinforce to prevent the bending of the teeth at the points where the continuations 8 project from the head. The provision of the curved working ends 6 provides against the teeth tearing or digging up the tender roots.

The clip 3 comprises a member which is constructed of sheet metal, being formed with an interrupted annular portion 9, which surrounds the head 2 and with transversely curved clamping tongues 10, which project from the ends of the portion 9 and lie over the upper and under sides of the forward end of the handle, the tongues 10 constituting in effect a socket for the handle. The forward end of the latter is tapered, as shown in Fig. 6 and is secured between the tongues 10 by a rivet, as 11, and by a bolt fastening, as 12. The latter passes through a transverse groove, as 13, in the forward extremity of the handle and is positioned near the portion 9 for a purpose which will presently appear. The head 2 is provided with a forwardly projecting pin, as 14, which extends through a vertically disposed slot, as 15, in the portion 9, and which serves to limit the movement of the head in either direction, either by reason of adjustment or in the course of its yielding action.

The connecting resilient wire braces 5 are preferably of curved outline and concentric arrangement. Any number of these braces may be employed, in accordance with the size of the rake, and they may have any desired spacing. For the purpose of strength they may, at their ends where they are connected to the handle, be formed in a manner similar to the teeth 4, that is, with strengthening coils 16. They are also formed with vertically disposed coils, as 17, at their ends where they are connected to the head 2, and beyond the coils 17, angular extensions, as 18, are provided, which project transversely through the head 2, and have flattened extremities to prevent displacement. The coils 17 have a resilient bearing action on the head 2 and serve to cushion, regulate, and retard the yielding movements of the latter.

When it is desired that the head be rigidly held, the nut of the fastening 12 is tightened sufficiently. By loosening the nut, the head 2 may be turned to any position within the limits provided and may be rigidly held in such position by again tightening the nut. In this manner the angular disposition of the teeth 4 may be adjusted as desired. When, however, it is desired that the head be yieldably maintained, the nut of the fastening 12 is loosened sufficiently to provide for the necessary play of the head, such play being normally retarded by the bearing action of the coils 17. In case such an obstruction is encountered as would normally have a tendency to break or bend the teeth 4, the head will yield to prevent this effect and this yielding movement will be regulated and cushioned by the spring coils 17, which restore the head to normal position, as soon as the obstruction is passed.

Having fully described my invention, I claim:

1. In a rake, the combination with a head, a handle and means to connect the head and the handle, of teeth carried by the head, means associated with the connecting means to hold the head rigid or to permit of its pivotal yielding movement and means to cushion the pivotal yielding movement of the head and to restore the latter to normal position after each yielding movement thereof.

2. In a rake, the combination with a head, a handle and a clip connecting the head and the handle and having a portion encircling the former to permit of the partial rotation thereof, of teeth carried by the head and resilient wire braces connecting the head and the handle and having spring coils adjacent the head and angular continuations projecting from the coils and fastened in the head.

3. In a rake, a head, a handle having a recess 13 in its end face, a clip integral throughout its extent and having an interrupted annular portion 9 conformably surrounding the head, and tongues 12 projecting from the annular portion and lying against the handle at opposite sides thereof, a fastening 11 connecting the tongues and the handle, a bolt 12 additionally connecting the tongues and extending through the recess 13 and teeth carried by the head.

In testimony whereof I have hereunto set my hand in presence of two subscribing witnesses.

JOSEPH N. PARKER.

Witnesses:
FRANK STANLEY,
L. H. HUNNEWELL.